Sept. 30, 1958 L. H. LIGHT 2,854,615
CIRCUIT ARRANGEMENT FOR PROVIDING A D. C. OUTPUT
Filed Jan. 16, 1956

INVENTOR
LEON HENRY LIGHT
BY [signature]
AGENT 2,854,615

CIRCUIT ARRANGEMENT FOR PROVIDING A D. C. OUTPUT

Leon Henry Light, London, England, assignor, by mesne assignments, to North American Philips Company, Inc., New York, N. Y., a corporation of Delaware Application January 16, 1956, Serial No. 559,369

Claims priority, application Great Britain January 18, 1955

8 Claims. (Cl. 321—2)

The invention relates to a device for producing a direct voltage by means of an oscillator, and more particularly to a transistor oscillator and a rectifier to convert the oscillator oscillations into the desired direct voltage.

Copending U. S. patent applications, Serial No. 514,078, filed June 8, 1955, and Serial No. 442,774, filed July 12, 1954, describe oscillators in which the current through the main current circuit of a transistor passes through an inductance and is abruptly interrupted, a voltage peak being thus produced across the inductance. The voltage peaks are rectified, in order to produce a direct voltage. In one embodiment of this device, the emitter of a PNP transistor is connected to the positive terminal of a direct-voltage source, while its collector is connected to the negative terminal of the direct-voltage source through the primary winding of a transformer and its base is connected to the emitter through the secondary winding of the transformer in series with a resistor. Negative voltage peaks are produced across the primary winding of the transformer at the instant when the transistor is cut off and the amplitude of these peaks may be many times larger than the voltage of the direct-voltage source. The voltage peaks are supplied to a smoothing filter through a rectifier, so that a direct output voltage is produced, which may be fed to a load impedance.

In such devices, the power supplied by the direct-voltage source during each cycle of operation is substantially constant and independent of the value of the load impedance, so that the voltage applied to the load impedance varies in accordance with the value of said load impedance. This has the disadvantage that, if the load is switched off, the voltage across the smoothing filter becomes very large, and the power which cannot be dissipated in the load impedance is dissipated in the transistor oscillator, so that the transistor may be damaged.

It has been found that, under certain conditions, for example, if the collector-emitter voltage is applied very gradually, a relaxation oscillator of the kind described does not oscillate. This fact may be accounted for by the circumstance that the transistor is operated at a working point where its emitter current is substantially zero, so that it exhibits a small amplification. In order to cause such an oscillator to oscillate, it is necessary to apply the collector-emitter voltage very abruptly, so that, due to the collector-emitter capacity, a current flows through the inductance. By means of the transformer, this current produces a base current so that the oscillator starts oscillating. If the collector-emitter voltage is not switched off and the base is biased so strongly that the transistor is cut off, the base current is suppressed. It has been found that the oscillator does not re-start oscillating, until it is urged to do so in some way or other, for example by switching the supply source off and on. The transistor oscillator may thus, under identical operational conditions, be either in an oscillating state or in a stable, non-oscillating state.

The invention has for its object to provide a device in which the oscillation is prevented when the direct output voltage exceeds a predetermined value, for example, due to the load impedance being switched off or interrupted.

The device according to the invention has the feature that, if the direct voltage produced exceeds a predetermined value, a quenching signal is produced, which is supplied to the oscillator and quenches the oscillation, after which, the stable, non-oscillating state is maintained after the quenching signal has fallen out.

The quenching signal is preferably produced by means of an element, which breaks down as a given voltage is applied thereto and which is connected in series with a resistance included in the base circuit and to a smoothing capacitor, in such a manner, that, if the direct voltage exceeds the predetermined value, the said element breaks down, the smoothing capacitor discharges through the said resistance and produces a bias voltage which is applied to the base of the transistor and which prevents the device from oscillating, the discharge current of the capacitor decreasing gradually at a rate such that the transistor remains in its non-oscillating state after the discharge has died out. The said element may be a gas discharge tube; in this case, the voltage drop across such a tube becomes lower than the break-down voltage of the tube, so that a high current flows abruptly from the smoothing capacitor through the base resistor.

In order that the invention may readily be put into effect, it will now be described with reference to the accompanying drawing, in which.

In the different figures, corresponding elements are designated by the same reference numerals.

Figure 1:
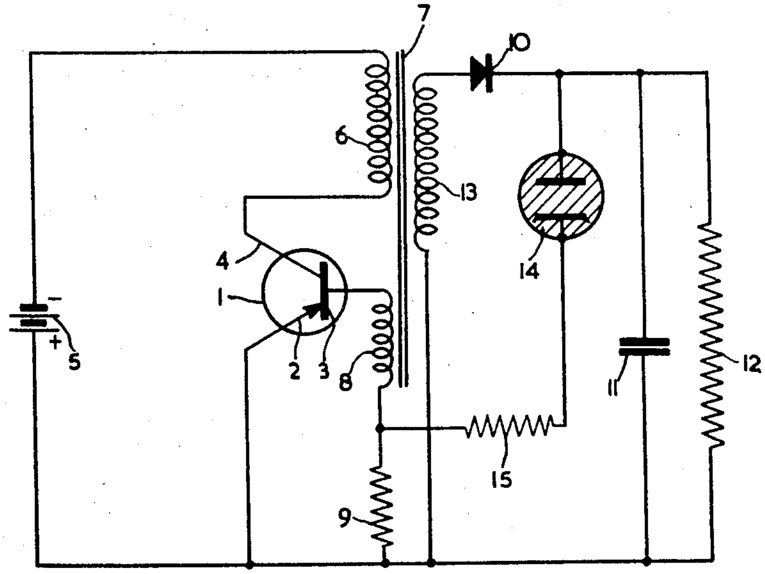
Fig. 1 is a schematic diagram of an embodiment of the circuit arrangement of the present invention.

The embodiment shown in Fig. 1 comprises a PNP junction transistor 1, of which the emitter 2 is connected to the positive terminal of a direct-voltage source 5, for example, a battery, of for example 3 volts. The collector 4 of the transistor is connected via a primary winding 6 of a transformer 7 to the negative terminal of the source 5 and its base 3 is connected through a secondary winding 8 of the transformer 7 and a resistor 9 to the positive terminal of the source 5. The transformer 7 has a third winding 13, which is connected via a rectifier 10 to one terminal of a smoothing capacitor 11 and of a load 12 connected in parallel with said smoothing capacitor. The other end of the winding 13 is connected to the positive terminal of the source 5. A gas discharge tube 14 is connected between the junction of the rectifier 10 and of the smoothing capacitor 11 and, through a resistor 15, to the junction of the secondary winding 8 and of the resistor 9. The resistors 15 and 9 thus constitute a potentiometer.

If the supply voltage of the source 5 is abruptly applied to the transistor-oscillator, the transistor 1 becomes conductive, a current passing thus through the primary winding 6. The increasing current through the winding 6 produces a negative voltage at the base terminal of the secondary winding 8, so that a sufficiently high emitter-base current flows to keep the voltage drop between the collector 4 and the emitter 2 very small. Substantially the complete voltage of the source 5 is thus applied to the inductance of the primary winding 6, so that the current passing through said primary winding increases substantially linearly and a constant direct voltage is produced across the secondary winding 8. This constant direct voltage produces a substantially constant base current of corresponding value. These conditions prevail until the collector current reaches the bend of the collector-current collector-voltage characteristic curve corresponding to the particular value of the base current. When the collector current reaches the said bend of the characteristic curve, the voltage across the transistor increases and the collector current increases less rapidly. Due to the presence of the transformer 7, the base current decreases, so that the collector current must also decrease. A positive voltage is thus produced across the secondary winding 8 and cuts off the transistor 1, a large negative voltage peak at the collector 4 and a high positive voltage peak at the rectifier end of the tertiary winding 13 being thus produced due to the interruption of the current through the winding 6. The rectifier 10 becomes conductive and the voltage across the winding 13 persists until the current passing through the load 12 and the smoothing capacitor 11 has decreased, a direct voltage which is positive relative to the positive terminal of the source being produced. At the termination of the decrease of the voltage across the secondary winding 13, the transistor 1 becomes conductive again and the cycle is repeated, so that the device oscillates further automatically.

As stated above, the power drained from the source 5 is substantially constant, so that the voltage across the load varies with the value of said load. It is therefore obvious that, if the load is switched out, the voltage across the smoothing capacitor 11 increases to a maximum value. However, in the device described, the discharge tube 14 breaks down before the maximum voltage is attained. As this tube breaks down, a current flows through the resistors 9 and 15, so that a positive quenching voltage is applied to the base 3 and the transistor 1 is cut off and prevented from oscillating. This positive voltage decreases in accordance with a time constant, which is mainly determined by the smoothing capacitor 11 and the resistors 9 and 15, whereby the tube 14 extinguishes. As a consequence, the direct voltages applied to the transistor are comparatively gradually restored to their initial values. The time constant is of the order of a few milliseconds to a few hundredths of seconds, and if this time constant is suitably chosen, the device does not automatically re-start oscillating. In order to re-start the oscillation, it is necessary to apply an electric pulse thereto, for example, by switching the source 5 off and on.

Under normal operational conditions, i. e. if a load of the correct value is connected in parallel with the capacitor 11, the discharge tube 14 does not break down. However, if the load is interrupted, the tube 14 becomes conductive during a comparatively short time only. It is therefore only required for the tube to be capable of absorbing the peak current produced by the discharge of the smoothing capacitor 11 during this short time and the tube may therefore be very small. It may be replaced by a different element breaking down at a given applied voltage, for example, by a Zener diode connected in the blocking direction.

In order to ensure the operation of the device shown in Fig. 1, it is necessary for the voltage across the winding 13 to exceed the break-down voltage of the discharge tube 14 under no-load conditions and not to exceed this voltage under normal operational conditions. If the prescribed voltage across the load and the voltage produced under no-load conditions deviate from the voltage required for the operation of the discharge tube, these may be produced by means of a separate winding with a rectifier and a smoothing capacitor of its own. The tube 14 is then connected to this additional part of the device, whereby the separate winding has the correct ratio of turns relative to the winding 13 in order to prevent oscillation when the voltage across the load exceeds the predetermined maximum value.

Figure 2:
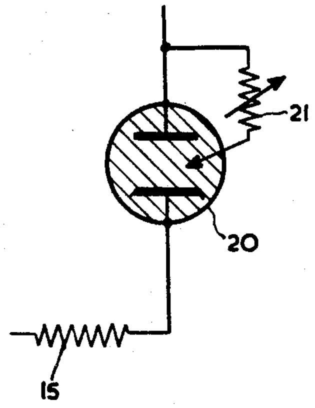
Fig. 2 is a modification of the embodiment of Fig. 1.

As an alternative, if a discharge diode 14 with the predetermined break-down voltage is not available, the arrangement shown in Fig. 2 may be connected instead of such a diode 14. The arrangement of Fig. 2 comprises a gas discharge triode 20, of which the anode break-down voltage may be varied in a given range by varying the current between an ignition electrode and the cathode of the tube by means of a variable resistor 21. With this modification, the predetermined value of the direct output voltage at which the oscillations are prevented can be controlled.

Figure 3:
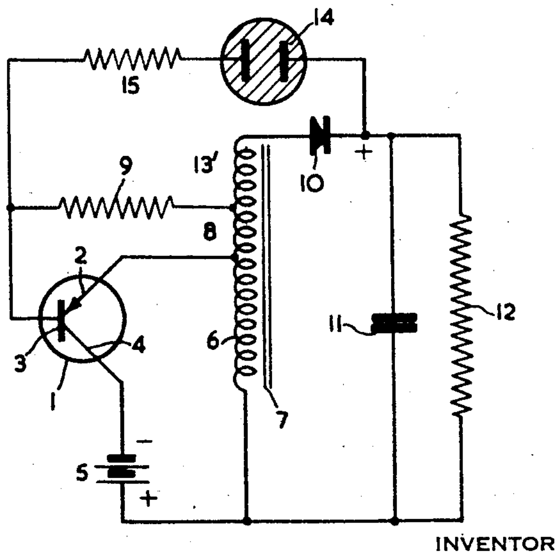
Fig. 3 is a schematic diagram of another embodiment of the circuit arrangement of the present invention.

In the embodiment shown in Fig. 3, the windings 6, 8 and 13 of the transformer 7 are connected directly to one another, so that they constitute a single winding with two intermediate tapping points. The emitter 2 is connected to one of these tapping points and through the winding portion 6 to the positive terminal of the source 5, while the negative terminal thereof is connected directly to the collector 4 of the transistor 1. The base 3 of the transistor is connected to the second tapping point through the resistor 9 and to the emitter 2 through the winding portion 8 intermediate the two tapping points. The end of the resistor 15 remote from the tube 14 is connected directly to the base 3 and to the corresponding end of the resistor 9. The winding 13 is constituted by the series-connected winding portions 6 and 8 and by another winding part 13', connected in series therewith.

The operation of the embodiment of Fig. 3 is substantially the same as that of the embodiment of Fig. 1, the difference being that the voltage applied to the tube 14 is equal to the direct voltage across the smoothing capacitor 11 plus a pulse-voltage component, the value of which is equal to the portion of the voltage peaks produced across the winding 13 which corresponds to the series-connected winding portions 6 and 8. Thus, the break-down voltage of the tube 14 must be chosen higher than the prescribed maximum voltage across the smoothing capacitor 11.

It is obvious that, in devices according to the invention, use may be made of junction transistors of the opposite conductivity type; in such case, the known inversion of polarities of the direct voltage source and similar changes have to be made.

While the invention has been described by means of specific examples and in specific embodiments, I do not wish to be limited thereto, for obvious modifications will occur to those skilled in the art without departing from the spirit and scope of the invention.

What is claimed is:

1. A circuit arrangement comprising an oscillator comprising an oscillating device having a control electrode, said oscillator exhibiting a stable oscillating condition and a stable non-oscillating condition, means for rectifying oscillations derived from said oscillator thereby to produce an output voltage, and means for controlling the operation of said oscillator as determined by the intensity of said output voltage, said latter means comprising means coupled to said rectifying means for producing a control signal at intensity values of said output voltage greater than a predetermined value, and means for applying said control signal to said control electrode whereby when the magnitude of said output voltage exceeds said predetermined value said oscillating device is biased to a quenched condition and said oscillator is placed in said non-oscillating condition.

2. A circuit arrangement comprising a transistor oscillator comprising a transistor having emitter, collector and base electrodes, said oscillator exhibiting a stable oscillating condition and a stable non-oscillating condition, means for rectifying oscillations derived from said oscillator thereby to produce an output voltage, and means for controlling the operation of said oscillator as determined by the intensity of said output voltage, said last-mentioned means comprising means coupled to said rectifying means for producing a control signal at intensity values of said output voltage greater than a predetermined value, and means for applying said control signal to said transistor oscillator whereby when the magnitude of said output voltage exceeds said predetermined value the said transistor oscillator is placed in said non-oscillating condition.

3. A circuit arrangement comprising a transistor oscillator comprising a transistor having emitter, collector and base electrodes, said oscillator exhibiting a stable oscillating condition and a stable non-oscillating condition, means for producing an oscillatory voltage at said collector electrode, means for deriving said oscillatory voltage from said collector electrode and means for rectifying said oscillatory voltage thereby to produce an output voltage, and means for controlling the operation of said oscillator as determined by the intensity of said output voltage, said last-mentioned means comprising means coupled to said rectifying means for producing a control signal at intensity values of said output voltage greater than a predetermined value, and means for applying said control signal to the base electrode of said transistor whereby when the magnitude of said output voltage exceeds said predetermined value said transistor is biased to cutoff and said oscillator is placed in said non-oscillating condition.

4. A circuit arrangement comprising a transistor oscillator comprising a transistor having emitter, collector and base electrodes, said oscillator exhibiting a stable oscillating condition and a stable non-oscillating condition, means for producing an oscillatory voltage at said collector electrode, means for deriving said oscillatory voltage from said collector electrode and means for rectifying said oscillatory voltage thereby to produce an output voltage, and means for controlling the operation of said oscillator as determined by the intensity of said output voltage, said last-mentioned means comprising a capacitor connected across the output of said oscillator and means for maintaining one electrical condition at intensity values of said output voltage less than a predetermined value and for maintaining another electrical condition at intensity values of said output voltage greater than said predetermined value, said last-mentioned means being connected between a common point between said rectifying means and said capacitor and said base electrode whereby when the magnitude of said output voltage exceeds said predetermined value said transistor is biased to cutoff by the discharge current of said capacitor and said oscillator is placed in said non-oscillating condition.

5. A circuit arrangement comprising a transistor oscillator comprising a transistor having emitter, collector and base electrodes, said oscillator exhibiting a stable oscillating condition and a stable non-oscillating condition, a first inductive circuit interposed between said emitter and collector electrodes and comprising a first inductive winding, a source of supply voltage connected in series with said first winding between said emitter and collector electrodes, a second inductive circuit interposed between said emitter and base electrodes and comprising a second inductive winding, said first and second windings being inductively coupled in feedback relationship thereby producing current flow between said emitter and collector electrodes whereby an oscillatory voltage is produced at said collector electrode, a third inductive circuit comprising a third inductive winding inductively coupled to said first winding, and means for rectifying said oscillatory voltage thereby to produce an output voltage, said rectifying means being connected in series circuit arrangement with said third winding, and means for controlling the operation of said oscillator as determined by the intensity of said output voltage, said last-mentioned means comprising a capacitor connected to said series circuit arrangement and means for maintaining one electrical condition at intensity values of said output voltage less than a predetermined value and for maintaining another electrical condition at intensity values of said output voltage greater than said predetermined value, said last-mentioned means being connected between a common point between said rectifying means and said capacitor and said base electrode whereby when the magnitude of said output voltage exceeds said predetermined value said transistor is biased to cutoff by the discharge current of said capacitor and said oscillator is placed in said non-oscillating condition.

6. A circuit arrangement comprising a transistor oscillator comprising a transistor having emitter, collector and base electrodes, said oscillator exhibiting a stable oscillating condition and a stable non-oscillating condition, a first inductive winding, a source of supply voltage connected in series circuit arrangement with said first winding between said emitter and collector electrodes, a second inductive winding, a first resistor connected in series circuit arrangement with said second winding between said emitter and base electrodes, said first and second windings being inductively coupled in feedback relationship thereby producing current flow between said emitter and collector electrodes whereby an oscillatory voltage is produced at said collector electrode, a third inductive winding inductively coupled to said first winding, one end of said third winding being connected to said emitter electrode, and means for rectifying said oscillatory voltage thereby to produce an output voltage, the input of said rectifying means being connected in series to the other end of said third winding, and means for controlling the operation of said oscillator as determined by the intensity of said output voltage, said last-mentioned means comprising a capacitor connected between the output of said rectifying means and a common point between said third winding and said emitter electrode, means for maintaining electrical non-conduction at intensity values of said output voltage less than a predetermined value and for maintaining electrical conduction at intensity values of said output voltage greater than said predetermined value and a second resistor connected at one end to a common point between said second winding and said first resistor, said last-mentioned means being connected between the other end of said second resistor and a common point between said rectifying means and said capacitor whereby when the magnitude of said output voltage exceeds said predetermined value said transistor is biased through said second resistor to cutoff by the discharge current of said capacitor and said oscillator is placed in said non-oscillating condition.

7. A circuit arrangement comprising a transistor oscillator comprising a transistor having emitter, collector and base electrodes, said oscillator exhibiting a stable oscillating condition and a stable non-oscillating condition, a first inductive winding portion, a source of supply voltage connected in series circuit arrangement with said first winding portion between said emitter and collector electrodes, a second inductive winding portion, a first resistor connected in series circuit arrangement with said second winding portion between said emitter and base electrodes, said first and second winding portions being inductively coupled in feedback relationship thereby producing current flow between said emitter and collector electrodes whereby an oscillatory voltage is produced at said collector electrode, a third inductive winding portion inductively coupled to said first and second winding portions, and means for rectifying said oscillatory voltage thereby to produce an output voltage, the input of said rectifying means being connected in series with said third winding portion, and means for controlling the operation of said oscillator as determined by the intensity of said output voltage, said last-mentioned means comprising a capacitor connected between the output of said rectifying means and a common point between said third winding portion and said source of supply voltage, means for maintaining electrical non-conduction at intensity values of said output voltage less than a predetermined value and for maintaining electrical conduction at intensity values of said output voltage greater than said predetermined value and a second resistor connected at one end to a common point between said first resistor and said base electrode, said last-mentioned means being connected between the other end of said second resistor and a common point between said rectifying means and said capacitor whereby when the magnitude of said output voltage exceeds said predetermined value said transistor is biased through said second resistor to cutoff by the discharge current of said capacitor and said oscillator is placed in said non-oscillating condition.

8. A circuit arrangement comprising a transistor oscillator comprising a transistor having emitter, collector and base electrodes, said oscillator exhibiting a stable oscillating condition and a stable non-oscillating condition, means for producing an oscillatory voltage at said collector electrode, means for deriving said oscillatory voltage from said collector electrode and means for rectifying said oscillatory voltage thereby to produce an output voltage, and means for controlling the operation of said oscillator as determined by the intensity of said output voltage, said last-mentioned means comprising a capacitor connected to the output of said rectifying means, means for lengthening the duration of discharge of said capacitor, means for maintaining one electrical condition at intensity values of said output voltage less than a predetermined value and for maintaining another electrical condition at intensity values of said output voltage greater than said predetermined value and a resistor coupled at one end to said base electrode, said last-mentioned means being connected between the other end of said resistor and a common point between said rectifying means and said capacitor whereby when the magnitude of said output voltage exceeds said predetermined value said transistor is biased through said resistor to cutoff by the discharge current of said capacitor and said oscillator is placed in said non-oscillating condition.

References Cited in the file of this patent

UNITED STATES PATENTS

| | | |
|---|---|---|
| 2,730,576 | Caruthers | Jan. 10, 1956 |
| 2,751,545 | Chase | June 19, 1956 |
| 2,757,243 | Thomas | July 31, 1956 |
| 2,759,142 | Hamilton | Aug. 14, 1956 |
| 2,764,688 | Grayson et al. | Sept. 25, 1956 |
| 2,791,739 | Light | May 7, 1957 |

OTHER REFERENCES

"Self-keyed Transistor Oscillators" (Alexander, Jr.), Electronics, July 1954, page 216.

"Transistor Audio Source," Electronics, December 1954, page 182.